Oct. 15, 1935.　　　　A. SHATKIN　　　　2,017,513
AUTOMATIC COPYING LATHE
Filed March 23, 1933　　　10 Sheets-Sheet 1

INVENTOR
Aaron Shatkin
BY
ATTORNEY

Oct. 15, 1935.   A. SHATKIN   2,017,513
AUTOMATIC COPYING LATHE
Filed March 23, 1933   10 Sheets-Sheet 3

INVENTOR
Aaron Shatkin
BY
ATTORNEY

Oct. 15, 1935.                A. SHATKIN                    2,017,513
                        AUTOMATIC COPYING LATHE
                       Filed March 23, 1933        10 Sheets-Sheet 4
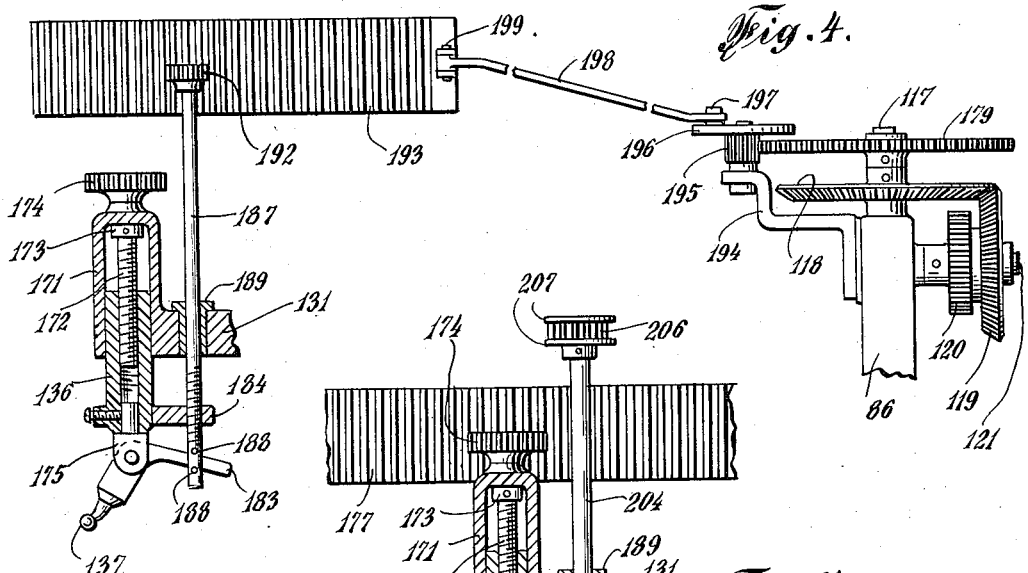
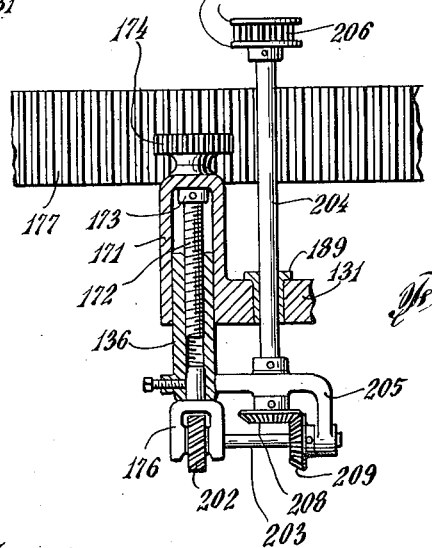
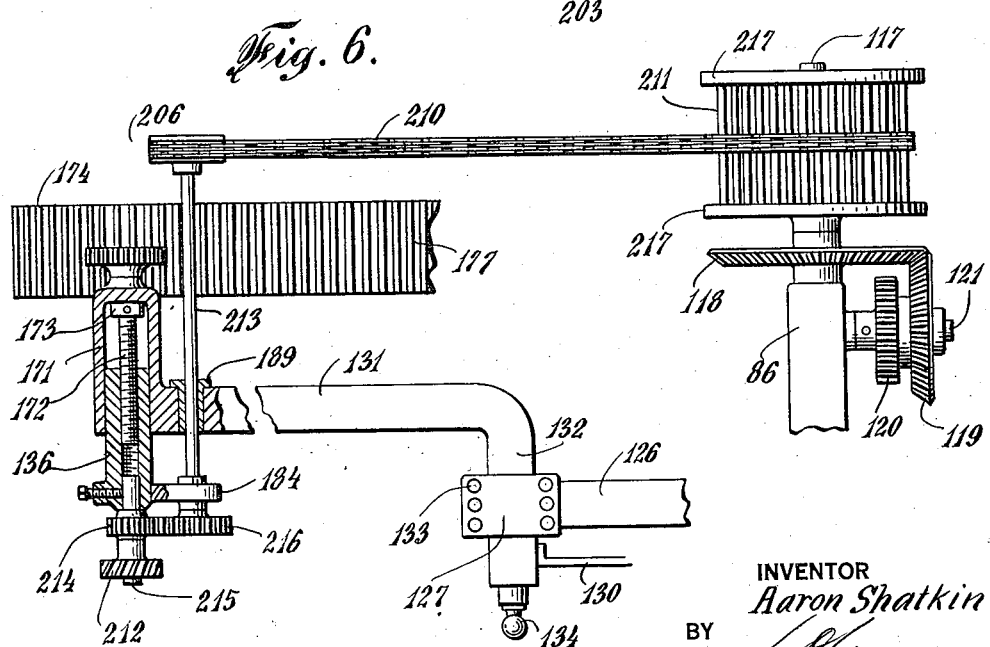
INVENTOR
Aaron Shatkin
BY
ATTORNEY

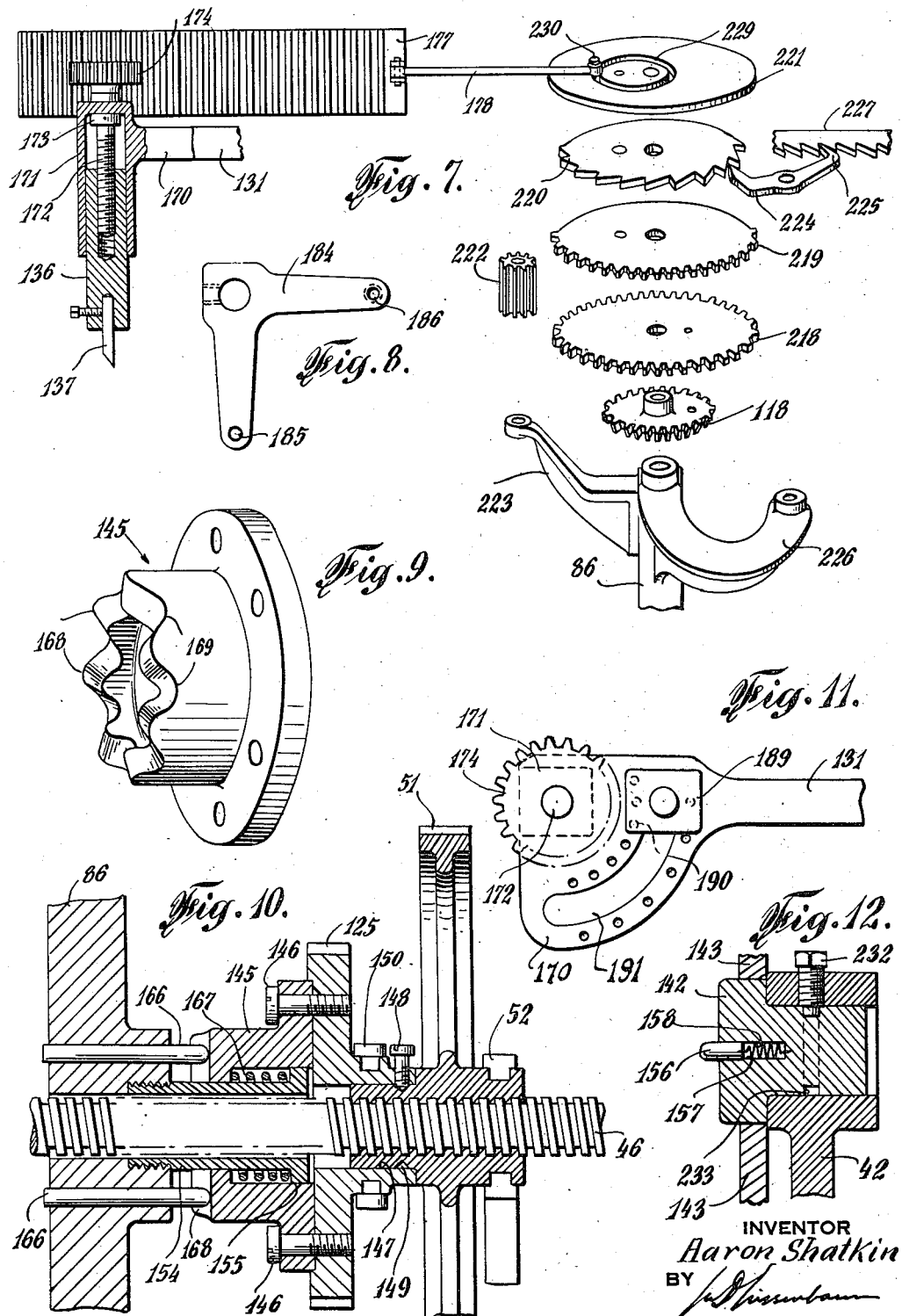

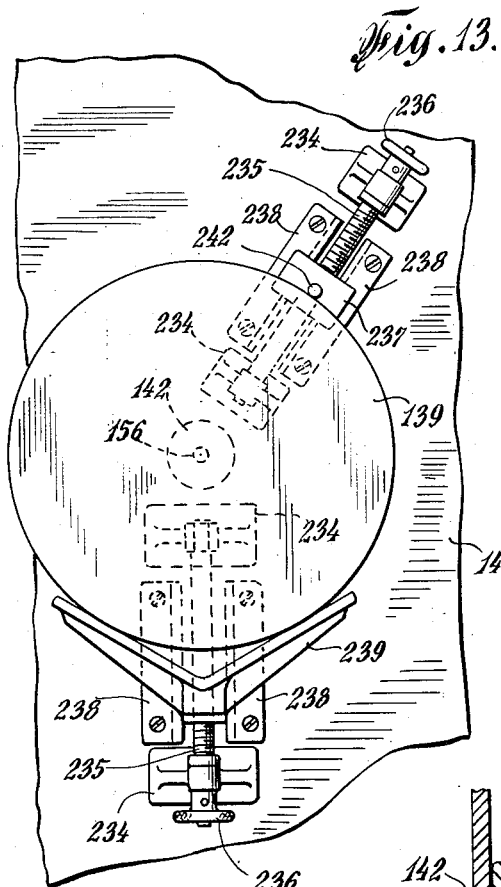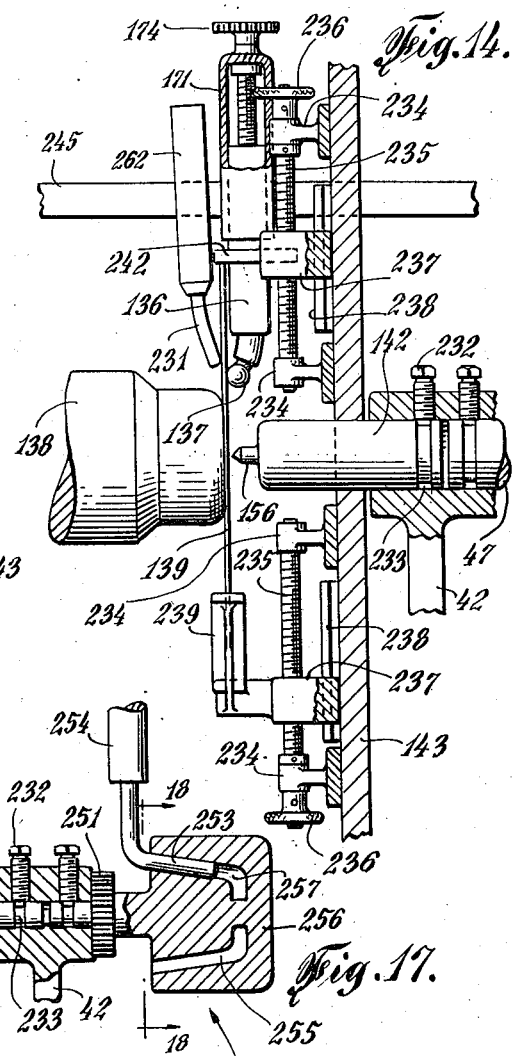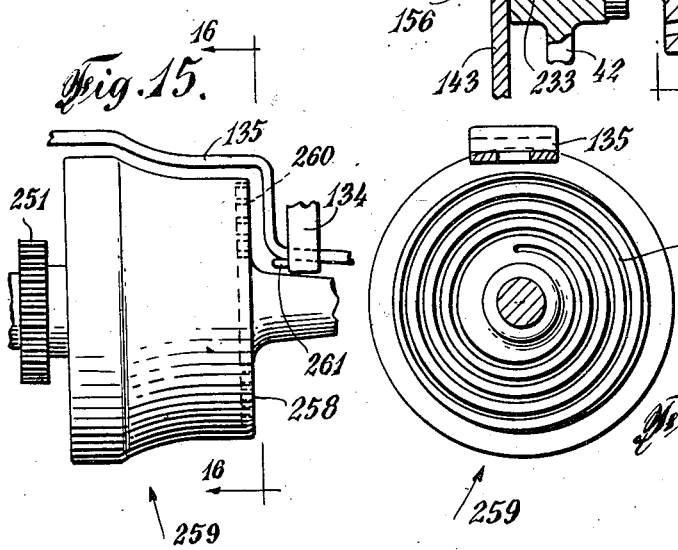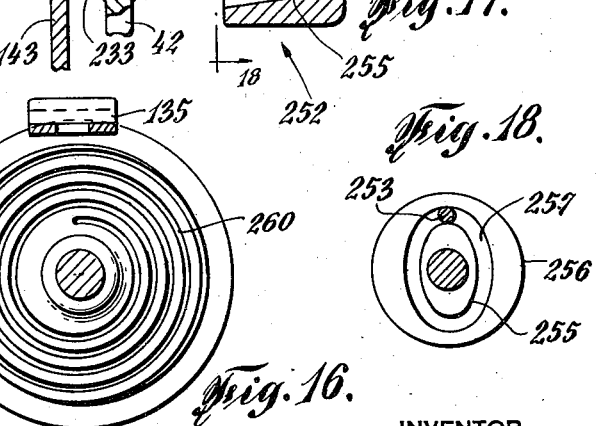

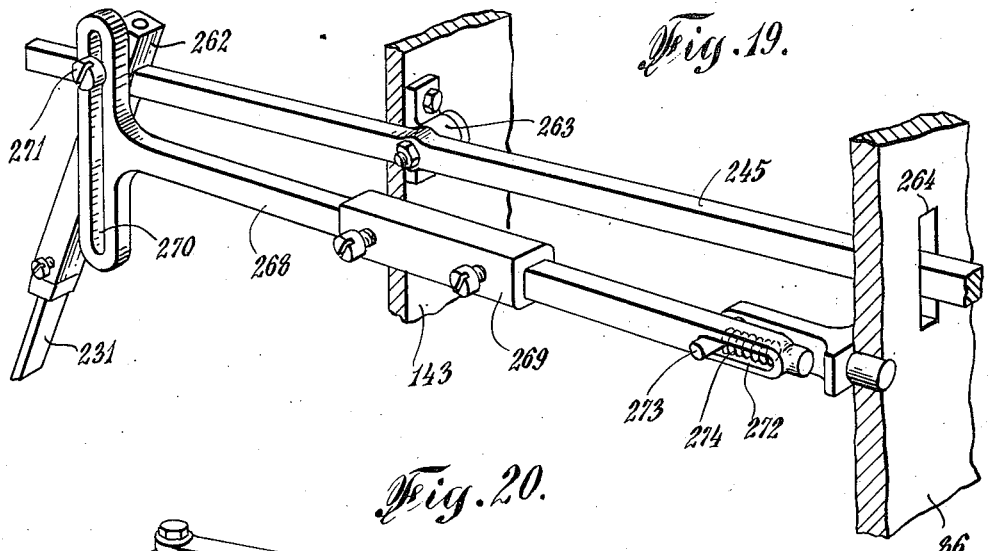
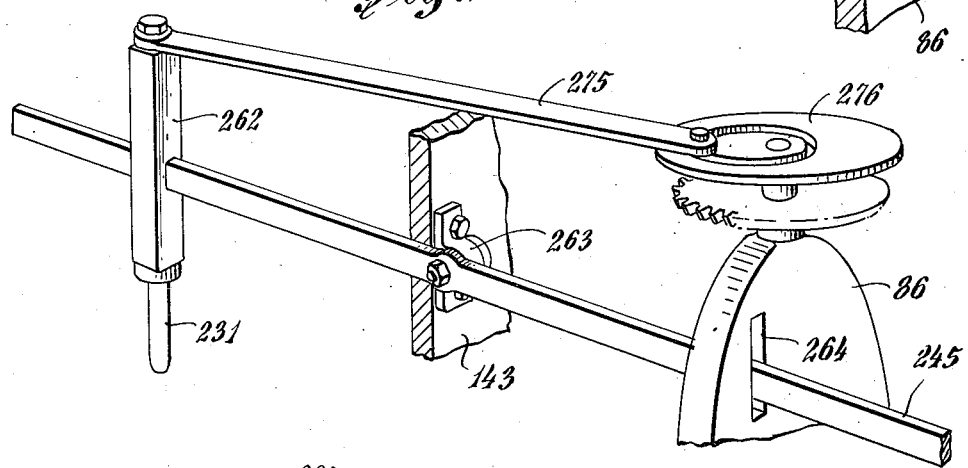
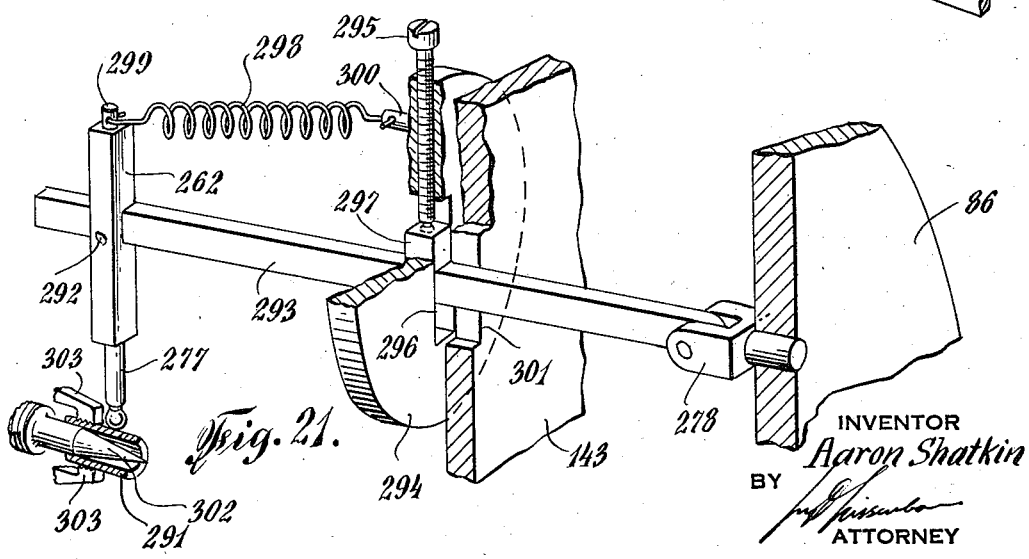

Oct. 15, 1935.  A. SHATKIN  2,017,513
AUTOMATIC COPYING LATHE
Filed March 23, 1933    10 Sheets-Sheet 8
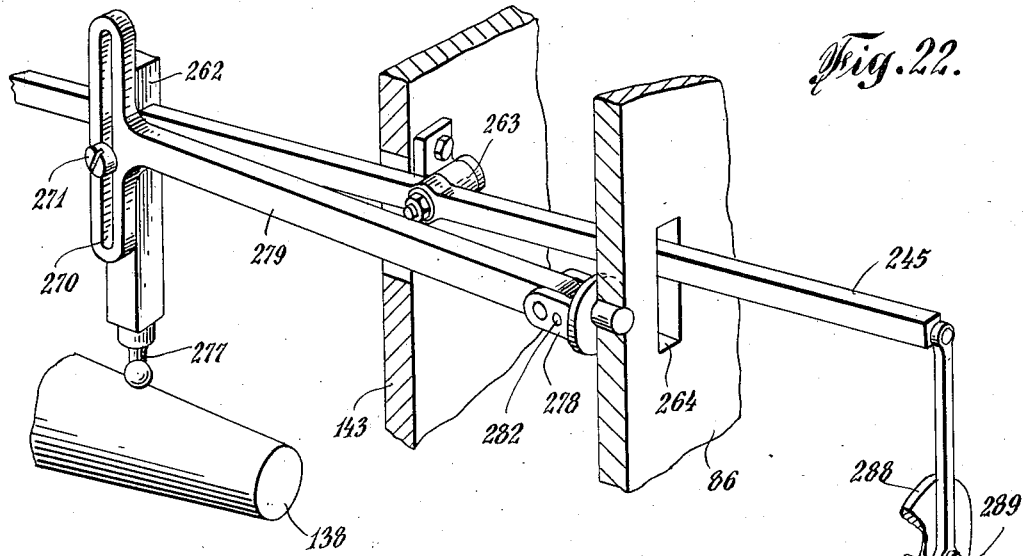
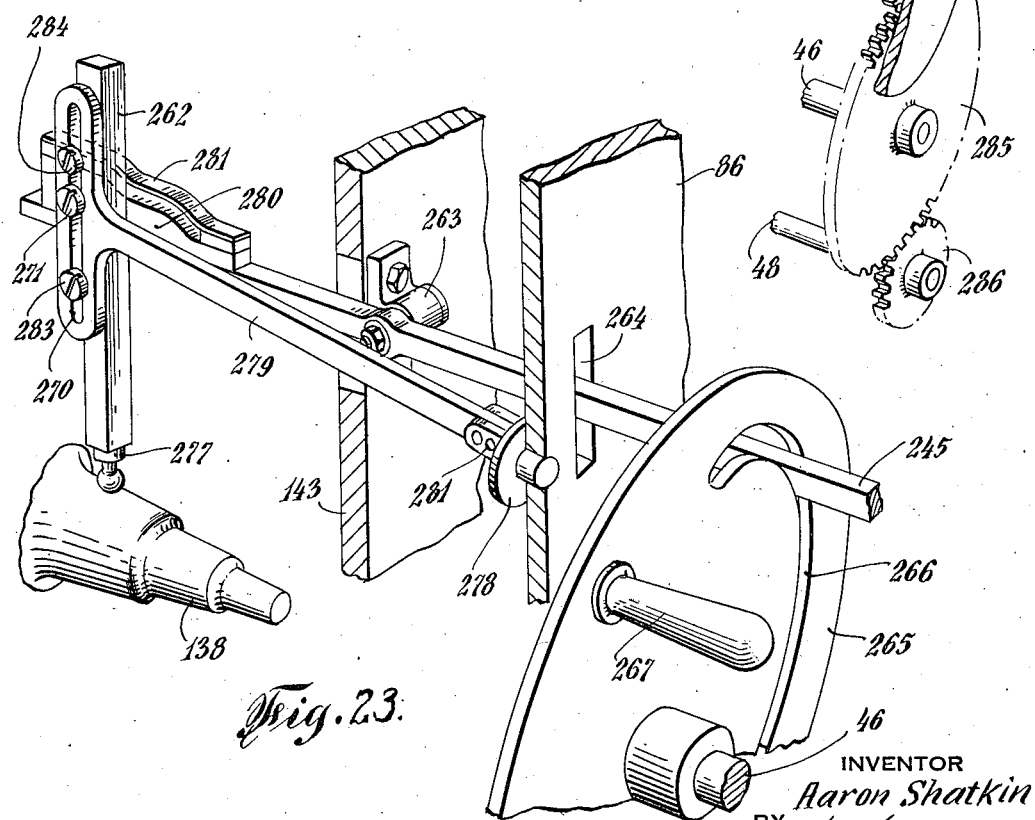
INVENTOR
Aaron Shatkin
BY
ATTORNEY Oct. 15, 1935.  A. SHATKIN  2,017,513
AUTOMATIC COPYING LATHE
Filed March 23, 1933     10 Sheets-Sheet 9
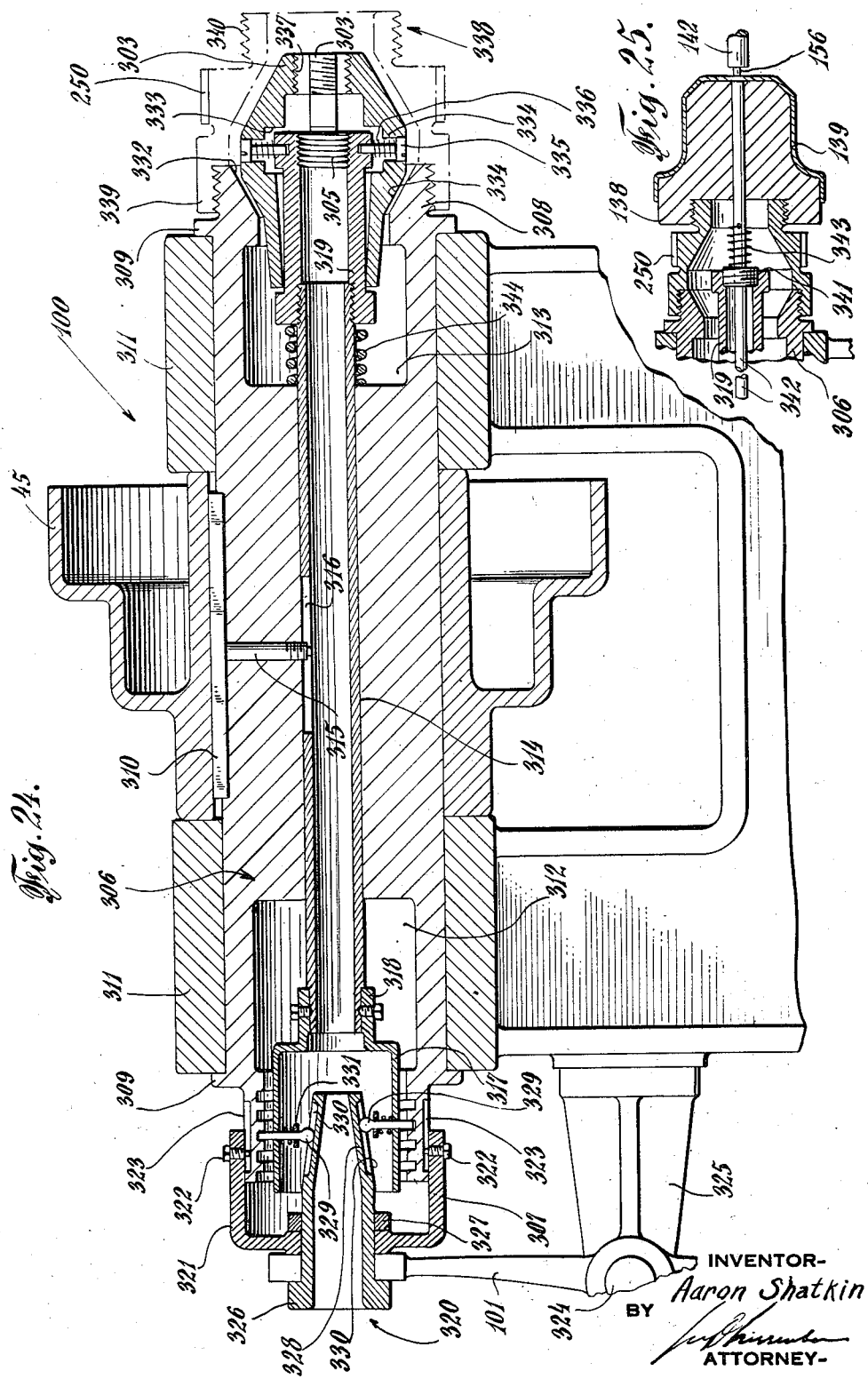
INVENTOR-
Aaron Shatkin
BY
ATTORNEY-

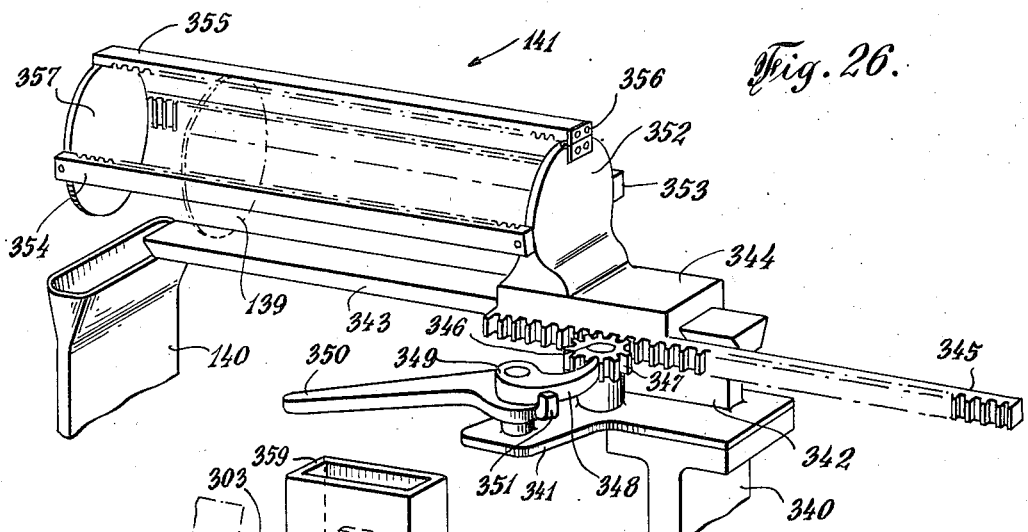
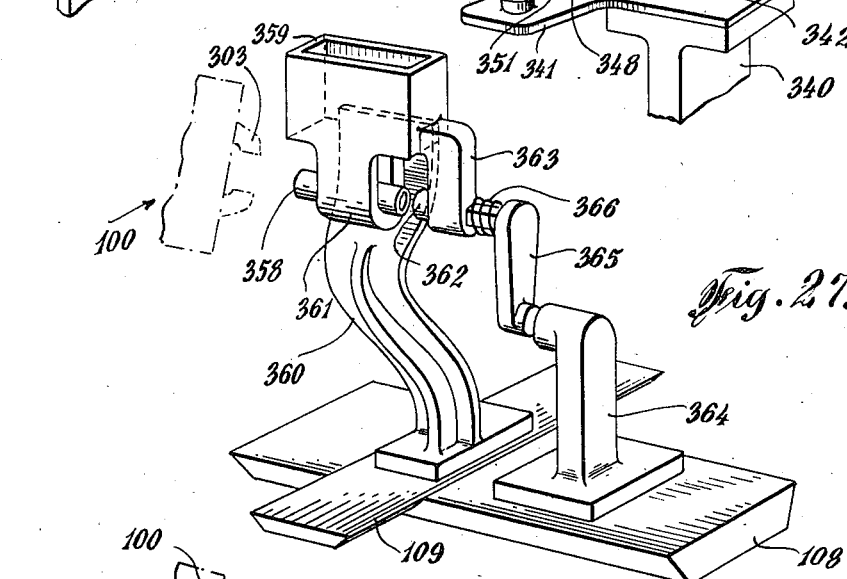
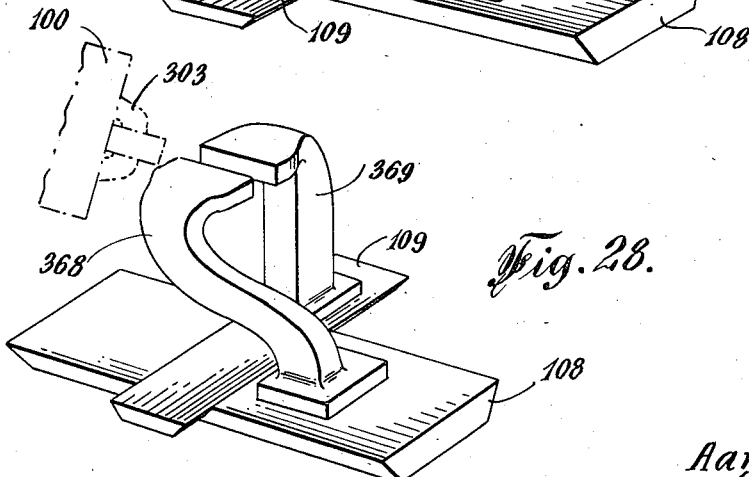

Patented Oct. 15, 1935

2,017,513

UNITED STATES PATENT OFFICE 2,017,513

AUTOMATIC COPYING LATHE

Aaron Shatkin, Brooklyn, N. Y.

Application March 23, 1933, Serial No. 662,212

23 Claims. (Cl. 82—14)

My present invention relates to automatic copying machines of the type wherein the working tool is guided by the follower tool, the latter of which is in contact with a pattern, and more particularly, my present invention is concerned with automatic copying lathes for spinning sheet metal shells, and also adapted to copy solid articles made of metal, wood, hard rubber, celluloid or other materials requiring turning, milling, shaping, fluting, rolling or similar operations.

One of the principal objects of this invention is to provide a copying machine for spinning sheet metal shells of various shapes, in which the working tool is given various motions to duplicate the actions and behavior of spinning tools as guided and manipulated by human hands, and which machine is completely automatic in its operation.

In various sheet metal spinning operations, the working tool, simultaneously while being moved along the work, need be given a rapid short range reciprocating motion along a line parallel with the axis of the shell being spun, and at times, a similar motion along a line perpendicular thereto, and as may be required, an oscillating motion in a plane in which the axis of the shell lies, or in a plane intersecting therewith.

Another object of this invention is to provide means to impart to the working tool any of these motions, singly or combined, together with means to adjust the scope of each of said motions, as well as to change the plane in which the working tool is to oscillate.

In various other sheet metal spinning operations, and in milling operations, it is necessary or desirable to use a revolving tool, which may be either a wheel, a ball or a cutter, as the case may be, whose axis of rotation is parallel to the axis of the shell or work, or perpendicular thereto, or in angular relation therewith.

Another object of this invention is to provide means to impart to the working tool any of such motions, either alone or in connection with any or both of the reciprocating motions aforementioned.

A further object is to provide a back tool for metal spinning operations as is necessary on thin gage sheetings, and desirable for all thicknesses of sheetings, together with means to control the motion of the back tool independently of the working tool.

A further object is to provide a preliminary or auxiliary tool to prepare the way for the main working tool by accomplishing a portion of its work; the path of motion of which preliminary tool is independently controlled, and may be either a path parallel, inclined or irregular with respect to the axis of the shell or article worked upon, while for certain classes of work, the said preliminary tool can act alone.

Another object of my invention is to provide means whereby the follower tool will actually climb steep portions of a pattern, and will be aided in its motion along the pattern.

A further object of my present invention is to provide means whereby the cross section of the article copied, may be made other than circular.

Another principal object of my present invention is to provide an automatic copying machine of the type aforesaid, which by substitution of cutting tools in place of the spinning tools aforementioned, the machine may then perform turning, milling, fluting and shaping operations on solid materials, and by the utilization of proper tools, to perform forming operations in sheet metal shells.

Another object is to provide automatic means to feed the tools onto the work, and to adjust the thickness of shaving or cut or depth of operation of the working tool, and further to provide a chuck of novel construction which is free from any lateral thrust, wherein the jaws are automatically operated by means provided in my machine and particularly adapted for automatic machine work.

With these and incidental objects in view, I herein set forth an embodiment of my present invention, explaining in detail the novel features of its construction and the novel combinations attainable in this invention.

I realize that this invention is capable of numerous forms and various applications without departing from the essential features herein disclosed. It is therefore intended and desired that the embodiment shown herein be deemed illustrative and not restrictive, and that the patent shall cover whatever features of patentable novelty exist in the invention disclosed; reference being had to the appended claims rather than to the specific description herein to indicate the scope of the invention.

In the accompanying drawings forming part of this application, similar characters of reference indicate corresponding parts in all the views.

Fig. 4 is a fragmentary view showing mechanism to impart to the working tool a short range oscillating motion.

Fig. 5 is a fragmentary view showing mechanism to impart to the working tool, in this instance a milling cutter, a rotary motion about a horizontal axis.

Fig. 6 is a fragmentary view showing mechanism to impart to the working tool, in this instance also a milling cutter, a rotary motion about a vertical axis, and the means for driving the same.

Fig. 7 is a fragmentary view including a lathe tool as the working tool, and showing an exploded view of the mechanism to feed the said tool onto the work.

Fig. 8 is a view showing the bracket used to mount the miller driving shaft and the oscillator tool actuating shaft.

Fig. 9 is a perspective view of the wave cam used in the mechanism to impart to the working tool a rapid short range reciprocating motion while the working tool is being moved along the work.

Fig. 10 is a fragmentary section, showing the mechanism used to impart to the working tool a rapid short range reciprocating motion in a line perpendicular to the short range reciprocating motion aforesaid.

Fig. 11 is a fragmentary plan view of the working tool actuating mechanism, showing the arrangement used to adjust the plane in which the tool is to oscillate.

Fig. 12 is a fragmentary view showing in section, the construction of the tail spindle.

Fig. 13 is a front view of a circular blank centering mechanism.

Fig. 14 is a side view thereof, together with both tive positions with respect to the circular relative positions with respect to the circular blank at or about the commencement of the spinning operation.

Fig. 15 is a view showing a pattern having a steep wall and the type of follower tool used in such instance.

Fig. 16 is a side view of such pattern showing the spiral groove cut into the steep surface aforesaid, wherein the climbing follower tool becomes engaged.

Fig. 17 is a fragmentary view, partly in section, of a pattern and its internal follower tool used on work having an oval section.

Fig. 18 is a section taken at line 18—18 in Fig. 17.

Fig. 19 is a fragmentary perspective view, partly in section, showing the back tool in arrangement with means used to materially avoid a short range reciprocating motion thereof.

Fig. 20 is a fragmentary view, partly in section, showing a preliminary tool (auxiliary or back tool) and the cam means to guide its motion.

Fig. 21 is a fragmentary perspective view, partly in section, showing mechanism to spin short tapered tubes.

Fig. 22 is a fragmentary perspective view, partly in section, showing a preliminary tool and mechanism to impart to same a swinging motion.

Fig. 23 is a fragmentary perspective view, partly in section, showing a preliminary tool adapted to follow a form or pattern, together with means to alter the path of same with respect to the axis of the lathe.

Fig. 24 is a view showing in section the construction of the chuck hereinbefore mentioned.

Fig. 25 is a fragmentary sectional view showing a shell ejector mechanism associated with the chuck.

Fig. 26 is a perspective view showing a device for automatically feeding blank discs into the centering device.

Fig. 27 is a perspective view showing a device for automatically feeding short pieces of rod or tubing to the chuck.

Fig. 28 is a perspective view showing a device for automatically feeding stock rod or tube through the chuck.

Figure 1:
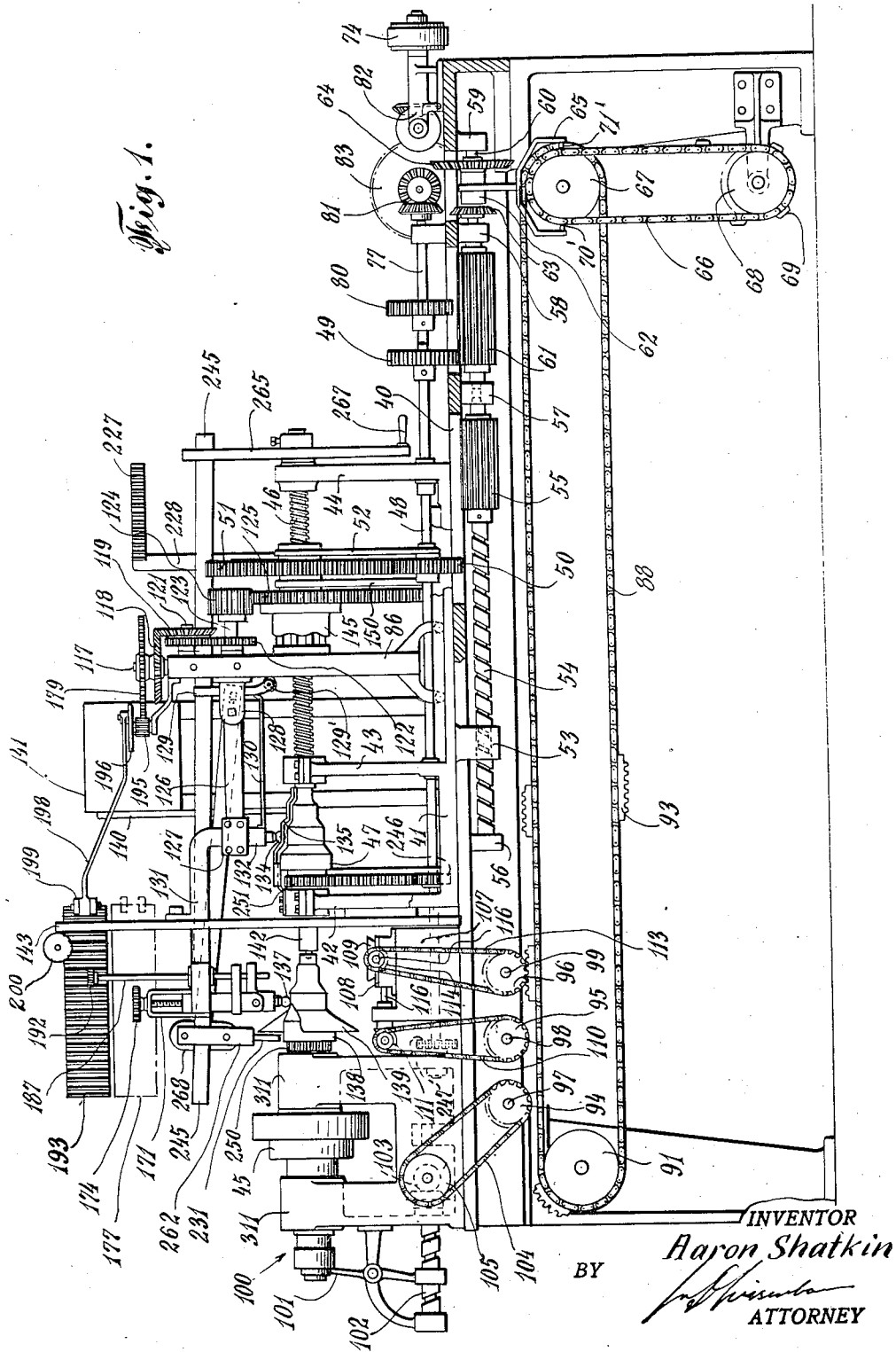
Fig. 1 is a front elevation of a machine embodying my invention showing a sheet metal shell in the process of being spun.
Figure 2:
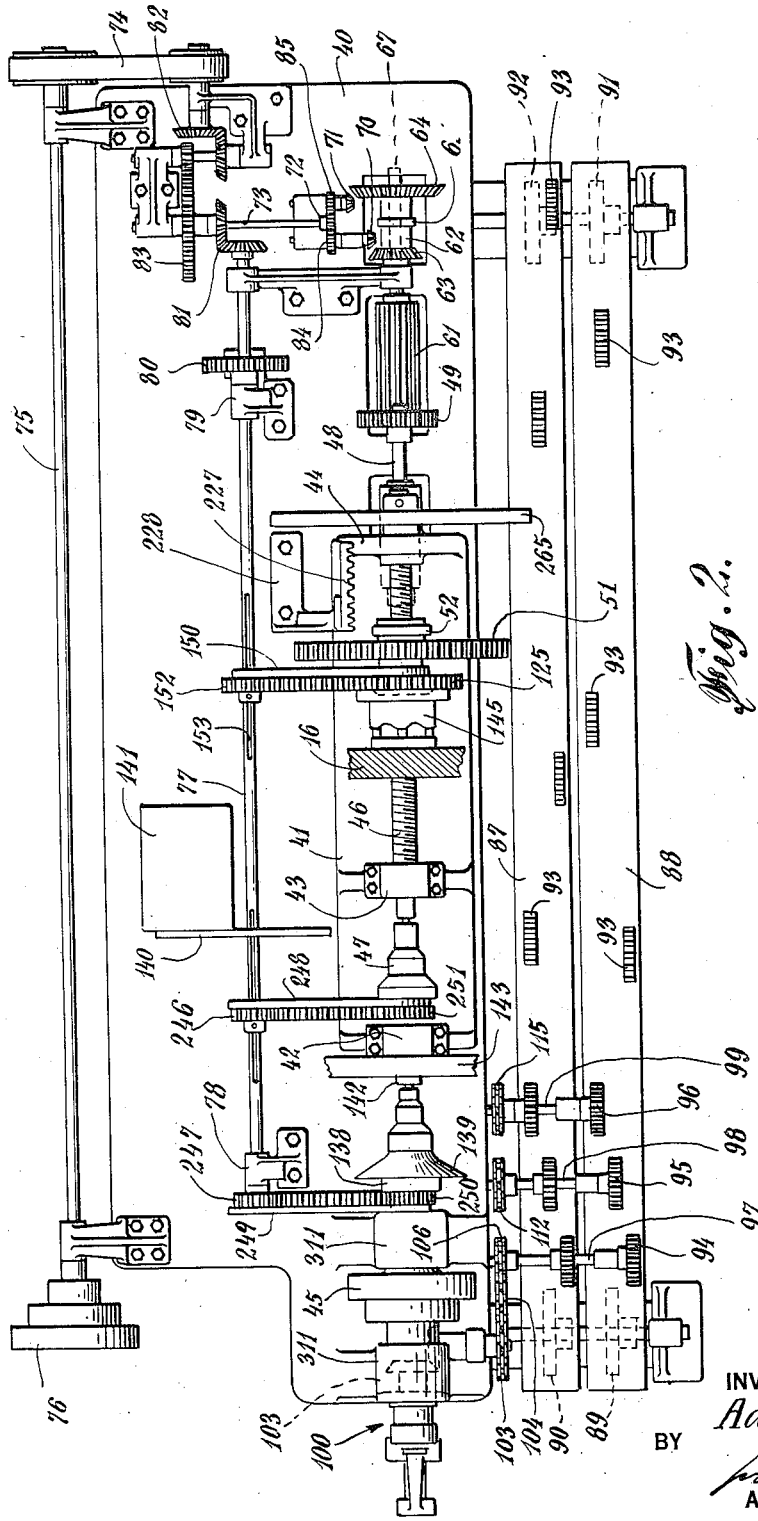
Fig. 2 is a fragmentary plan view in particular showing the drives.
Figure 3:
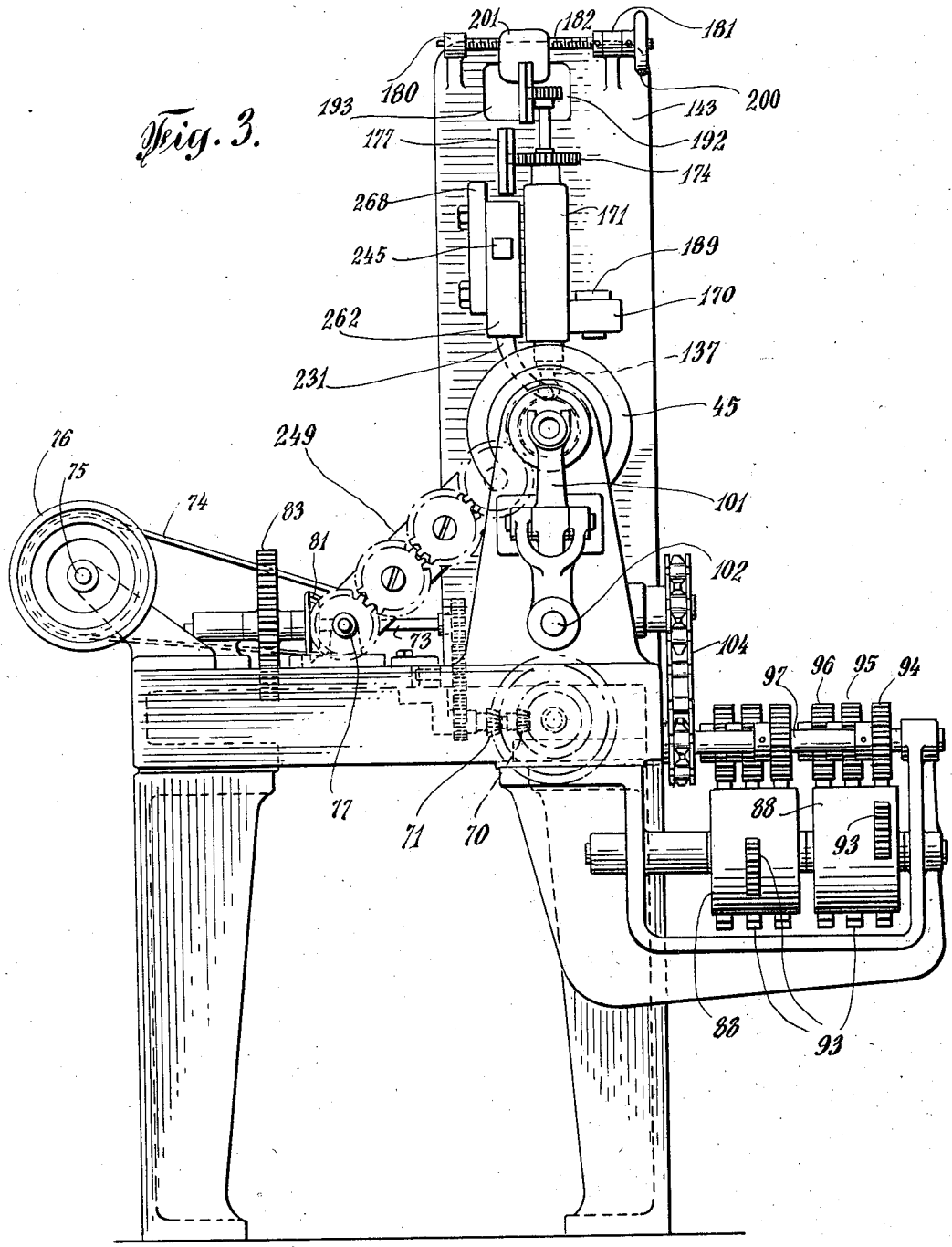
Fig. 3 is a side elevation of the machine taken at the head end thereof.

Slidably mounted on the bed of a lathe 40, is a carriage 41, having a shaft support 43 intermediate two end shaft supports 42 and 44. This carriage 41, holds in alignment with the main shaft which bears the cone pulley 45, both a stationary screw shaft 46, secured between the supports 43 and 44, and a pattern 47, mounted between the supports 42 and 43.

Near the bed of the lathe 40, a shaft 48 is rotatably supported between the supports 43 and 44, having a portion thereof extending beyond the support 44, terminating in a gear 49, secured thereto, and also having a loose keyed gear 50, slidably secured thereto in a slot in said shaft 48 therefor provided, between the supports 43 and 44. Mounted on the stationary screw shaft 46, and threadedly engaged therewith is a gear 51, which is always maintained in engagement with gear 50, by a follow plate 52, to which the hubs of each of said gears are journaled.

A downwardly extending lug 53, integral with the carriage 41, is threadedly engaged with a leading screw 54, which has secured thereto a wide-faced gear 55, and is journalled between the bearings 56 and 57, secured to the underside of the bed of the lathe 40.

In alignment with the leading screw 54, between the bearings 57 and 59, and through 58, is rotatably mounted a shaft 60, which has secured thereto a wide-faced gear 61, between bearings 57 and 58, in engagement with the gear 49, and a keyed reversing mechanism sleeve, terminating in the bevel gears 63 and 64, which are in opposed position. A shifter fork 65, mounted to slide to and fro, engages the sleeve 62, in an annular groove in said sleeve therefor provided.

A slow continuously moving chain belt 66, passes over the sprocket wheels 67 and 68 (motivating gearing not shown) and is provided with staggered chain link protruding attachments 69, which in their motion come in contact with the corresponding staggered shifter fingers 70' and 71', secured in the shifter fork 65, thereby sliding the reverse mechanism into either forward, reverse or neutral position, depending upon the length and position of the link attachments 69. This adjustment of the position of the reversing mechanism is with respect to the bevels 70 and 71, which gears rotate in like direction; being driven commonly by the gear 72, secured to the shaft 73, which is given its motion through a system of gearing shown driven by belt or chain 74, from the counter-shaft 75. This shaft 75, is provided with a cone pulley 76, to receive a belt from a motor or power shaft. A sub-countershaft 77, rotatably supported in the bearings 78 and 79, having secured thereto the gear 80, is driven through the bevels 81.

The portion of the machine thus far described, operates as follows:—From the countershaft 75, power is transmitted by belt or chain 74, through the system of gearing including the pairs of bevels 82 and 81, and the spurs 83, to the shaft 73, which terminates in a gear 72, positioned to engage the spurs 84 and 85, which thus rotate in like direction, and therefore the bevels 70 and 71, likewise rotate in like direction. When the shifter 65, is in such position so that bevels 71 and 64, are in engagement, the shaft 48, having gear 50, will rotate in one direction, while when the shifter 65, is in such position so that the bevels 70 and 63, are in engagement, the shaft 48, will rotate in the reverse direction. When the shifter fork 65, is in such position so that neither of bevels 63 or 64 are in engagement, then shafts 60 and 48, and hence gear 51, will all be at rest.

It is to be noted that gear 51, engaging the gear 50, will receive motion therefrom and will ride along the screw shaft 46, for specific distances dependent upon the number of rotations of the wide faced gear 61, and will always remain in engagement with its driving gear 50; being that the latter will be slid along its shaft 48, by the movement of the follow plate 52, in its travel with the large gear 51.

When the gear 50, is in such position that it engages the wide faced gear 55, at the head end of the machine, the leading screw 54, will be rotated; thus drawing back the carriage 41, away from the head end of the lathe 40, until said gears 50 and 55, become dis-engaged after the carriage 41, has been moved backward the length of said gear 55. The reverse motion of the gear 50, will bring it again in contact with said gear 55, at the tail end of the machine, and now will revolve the leading screw 54, in a direction reverse to its former rotation; thereby drawing the carriage 41, towards the head end of the lathe until said gears 50 and 55, become dis-engaged after the carriage 41, has traveled forward the length of said gear 55. It should be noted that the length of the gear 61, is greater than that of the gear 55, by an amount at least equal to the width of gear 49.

The sprocket chain attachments 69, are of such dimension to either slide the shifter 65, to its extreme positions for accomplishment of forward or reverse rotation of the shaft 60, as may be required, or to a neutral position whereupon the rotation of the shaft 60 ceases.

In this manner is provided means to control the position of the carriage 41, along the bed of the lathe 40, and to control the position of a member, in this instance the gear 51, with respect to the carriage 41; this gear 51, being adapted to impart forward and reverse motions to a pusher plate 86, which is slidable along the bed of the carriage 41.

In front, along the length of the lathe 40, is provided a pair of slow, oppositely, continuously moving chain belts 87 and 88, engaging the idler sprockets 89 and 90, and the driver sprockets 91 and 92, respectively, which latter receive their motions from gearing (not shown) driven from either the shafts 75 or 77 of the machine. Across the face of each of these chain belts 87 and 88, are secured demountable rack segments 93, in staggered relation, adapted to engage their related staggered pairs of gears 94, 95 and 96, which are secured on their particular shafts 97, 98 and 99 respectively.

The chuck mechanism, designated generally by the numeral 100, extending through the head of the lathe 40, is operated to open and close by the forward and reverse motion of a forked lever 101, actuated by the rotation of the leading screw 102, which receives its motion through the mitre gears 103, driven by a chain 104, engaging the sprockets 105 and 106, the latter of which is secured to shaft 97.

A supplementary tool fixture 107, demountably secured to the bed of the lathe 40, is provided with a pair of platforms or slides 108 and 109, movable longitudinally and transversely respectively with respect to the lathe. A chain 110, over the sprockets 111 and 112, constitute the system to drive the slide 108, while chain 113, over sprockets 114 and 115, are the means to drive the other slide 109. The construction of said slides 108 and 109, and their respective screw 116 driving mechanisms, are, as is ordinary in lathe slide rest construction.

It is to be noted that the position and length of the respective rack segments 93, determine and control the time, the duration and the operation of the chuck 100, and of any tools or mechanism which may be coupled or secured to the moveable slides 108 and 109 of the tool fixture 107.

Now I provide a pusher plate 86, slidingly mounted on the screw shaft 46, and slidingly secured to the bed of the carriage 41, adapted to slide along said carriage. At the top of this pusher plate 86, a shaft 117, is vertically mounted, adapted to receive the bevel gear 118, which is in engagement with a bevel gear 119, secured to a gear 120, rotatably mounted on a stud 121, horizontally secured to and extending from the rear of the pusher plate 86. Another gear 122, is likewise mounted on a shaft 123, terminating in a wide faced gear 124, to be in engagement with gear 125. By this arrangement, rotation of gear 125, will impart motion to gear 118.

On the side of the pusher plate 86, facing the head of the lathe, is an arm 126, having terminal bosses 127 and 128. A member 129, of square cross-section, is free to slide through boss 128, and terminates at its lower end in a rotatable wheel 129', adapted to slide along the face of the pusher plate 86. A brace 130, is secured connecting the member 129, and the elbow member 131; the square sectioned vertical arm 132 of which, is free to slide through boss 127 between the bearing rollers 133. The lower extremity of said arm 132, terminates in a tool post adapted to have secured therein what shall hereinafter be designated as the pattern tool 134, which rests on the pattern 47, and is slidable therealong between a track element 135, shaped to conform to the contour of the pattern 47, and adapted to prevent the pattern tool 134, from becoming disengaged; thereby insuring that said tool 134, in its motion along the pattern 47, imparted to it when the pusher plate 86 moves, will always be in contact with the pattern 47. Occurring at the other, or head end of the elbow arm 131, is a tool and its control and manipulating mechanism, hereinafter fully set forth, which includes a vertical member 136 terminating in a tool post adapted to receive and have secured therein the working or copying tool 137. In a metal spinning operation, the chuck pattern 138, upon which the blank 139 is being spun, is similar to the pattern 47, guiding the pattern tool 134; both patterns in this instance being circular in cross section.

At the commencement of a spinning cycle, the carriage 41, is furthest away from the head end of the lathe. A disc of sheet metal, commonly called a blank 139, drops down a chute 140, from an ordinary blank feeding device, designated herein by the numeral 141, and deposits itself in front of a tail spindle 142, in a centering device shown in Fig. 14, which is mounted on a plate 143, secured to the carriage 41, at the forward end. These blanks 139, may be fed by hand if desired.

A sprocket chain attachment 69, now comes in contact with the shifter finger 70, of the shifter 65, causing the shifter to alter its position, and thereby to cause gear 50 to be moved forward and to engage the gear 55, causing carriage 41 to move forward until blank 139 is centrally held against the chuck pattern 138, whereupon gears 50 and 55 disengage and the carriage 41 comes to rest. Now gear 51, continues to move forward together with the pusher plate 86, and the pattern tool 134, in its motion longitudinally along the contour of the pattern 47, causes a similar motion of the working tool 137, to conform or "spin" the blank 139, onto the chuck pattern 138.

Another link attachment 69, staggered from the link attachment mentioned, now comes in contact with the opposite shifter finger 71, of the shifter fork 65, urging the reversing mechanism into reverse, whereby the gear 51, the pusher plate 86, and the tools 134 and 137, are moved backward; the latter two, to the starting points of their respective patterns, whereupon gears 50 and 55 again engage for the backward sliding of the carriage 41. An ejector 342, mounted in the chuck 100, throws the finished shell 139 off the pattern 138, and the machine is ready to receive another blank 139 in position to repeat the cycle.

While the working tool 137, is pushed along the work 139, it is desirous and necessary at times to give said tool a longitudinal short range rapid reciprocating motion along a line parallel with the axis of the shell 139 being spun. To accomplish this, I provide a means shown in detail in fragmentary section in Fig. 10, comprising a wave cam 145, secured by screws 146, to a gear 125, which is rotatably mounted on the reduced hub 147, of the large gear 51, and maintained thereon by a screw 148, which projects into the annular groove 149. A follow plate 150, is journalled on the hub 151, of the gear 125, to carry a train of gears terminating in gear 152, which is slidably keyed to shaft 77, in a lengthwise groove 153 in said shaft therefor provided.

A bushing 154, provided with a flange 155 at one end, sets within the wave cam 145, and has its projecting end threadedly secured in the pusher plate 86. A pair of diametrically positioned pins 166, secured in the pusher plate 86, have their projecting ends in contact with the ridges 168 and falls 169 of the wave cam 145. A stiff coil spring 167 sets about the bushing 154, between the flange 155 and the inner wall of the wave cam 145. The bushing 154, as well as the gear 125, are free from the screw shaft 46.

In operation, gear 125, is made to rotate fast by motion derived through the train of gears driven by the end gear 152, thereby causing the pusher plate 86, and all secured or associated therewith to receive a short range reciprocating motion along a line parallel with the axis of the work 139, independent of the motion received from the movement of the large gear 51, along the stationary screw shaft 46, all due to the wave cam's forward shift, when the ridges 168 thereof are in contact with the pins 166, and due to the backward shift caused by action of the spring 167, when the pins 166 are opposite the falls 169 of the cam 145.

The range of the aforesaid reciprocating motion, depends upon the amount of projection of the pins 166 within the fall 169 of the cam 145, and therefore, the amount of their projection from the pusher plate 86, may be altered to adjust the range of such reciprocating motion imparted to the working tool 137.

It is readily understood that the tool 137, will thereby be given a similar short-range reciprocating motion at the very same time that it is being moved along the work 139. Should it be desired that the mechanism shown in Fig. 10, be inactive, then the spring 167 is removed, and a number of loose split collars (not shown) are placed on the bushing 154 to fill the space between the wave cam 145, and the pusher plate 86.

I provide that the arm 131, at its head end, terminate in a horizontal plate member 170, integral with an upwardly extending inverted hollow member 171, the bore of which is square in cross-section, and within which is slidable mounted a square sectioned tool post member 136, threadedly engaged by a leading screw 172, which is journalled to be rotated and therefore has secured thereto a collar 173, within the member 171, and a gear 174 at its external upper terminus. At the lower extremity of the tool post 136, provision is made to receive the working tool 137, or other attachments, as the elements 175 and 176, as may be required.

While the working tool 137, is pushed along the work 139, it is desirous and necessary at times to give this tool a rapid short range oscillating motion. To accomplish this, I provide a set up as is fragmentarily shown in Fig. 4, wherein a tool 137, is set within a bell-crank member 183, which is pivotally mounted between forked arms of a member 175, held secure in the tool post 136. At the lower extremity of 136, is secured an angular bracket 184, having a clear bore 185, and a threaded hole 186, near the extremities of its respective arms.

This bracket member 184, is so mounted in this instance, so that a partially threaded shaft 187, passes through the threaded hole 186, and engages the extending arm of the pivoted member 183, between the pins 188. This shaft 187, is vertically positioned through a bushing 189, which is secured by screws 190, to the plate member 170, to pass through a circular segmental slot 191. A gear 192, adapted to engage in a wide faced rack 193, slidably mounted through plate 143, is secured at the upper end of the shaft 187. At the front of the pusher plate 86, is demountably secured a bracket 194, supporting the rotatably mounted gear 195, which has secured thereto a wheel 196, having an eccentrically positioned pin 197, about which is pivotally mounted an end of a connecting rod 198, the other end of which is pivotally secured to the rack 193, by a pin 199.

A large gear 179, adapted to engage the small gear 195, is secured to the bevel gear 118. It is readily seen that the gear 195 will rapidly revolve and thus cause the rack 193, to reciprocate rapidly, which in turn will likewise cause the shaft 187 to revolve a little in one direction, then in the reverse, to and fro, whereby tool 137 will be caused to oscillate rapidly.

To impart to the tool 137, a rapid short range reciprocating motion along a line perpendicular to the axis of the work 139, that is, in a line perpendicular to the line of action of the short range reciprocating motion aforementioned, the gear 174, is adapted to be engaged by a rack 177, slidably mounted through plate 143, which rack, through the connecting rod 178, is associated and actuated by mechanism as shown in the right hand portion of the Fig. 4. It is understood that a second eccentric arrangement, similar to wheel 196 and pin 197, may be secured to the wheel 196; one to operate the rack 193, and the other to operate the rack 177, whereby the tool 137, will receive a rapid short range up and down motion in a vertical line, simultaneously while it oscillates, and if desired, the mechanism shown in Fig. 10, may be simultaneously operated to impart to the tool 137, a short range rapid reciprocating motion along a horizontal line. Thus it is evident that in my machine, I have provided means to impart to the working tool 137, simultaneously while it is being pushed along the work 139, any one, any two, or all three of the special motions hereinbefore specifically set forth, and to adjust the scope of the reciprocating motions, the position of the pins 197, is altered with respect to the centre of their respective wheels 196.

The rack 193, is mounted as follows:—Secured to the plate 143, are the brackets 180 and 181, having journalled therebetween a leading screw 182, controlled by a hand wheel 200. Engaged on said screw 182, is a track member 201, the position of which, along the screw 182, is altered by turning the hand wheel 200. The rack 193, is mounted free to slide through the track member 201.

Should it be desired that the plane of oscillation of the tool 137, be altered, then the position of the bushing 189, along slot 191, is shifted, as also the rack 193, by the hand wheel 200, so that said rack remain in engagement with the gear 192, and the bracket 184, is brought in alignment with the bore in bushing 189.

When it is desired to have a miller cutter for a working tool, I provide the arrangements shown fragmentarily in Figs. 5 and 6. In the Fig. 5, the miller cutter 202, rotating about a horizontal axis, is secured on shaft 203, between the forks of member 176, which is secured in the tool post 136. A shaft 204, is vertically mounted through bushing 189, and is journalled to special bracket 205. At the upper end of the shaft 204, I provide a sprocket wheel 206, having flange plates 207. At the lower end of the shaft 204, is secured a bevel gear 208, engaging a bevel gear 209, which is secured to the shaft 203. A chain 210, engages the sprocket 206, and a wide faced sprocket 211, which is secured to bevel 118, and is speedily driven by the system of gearing on the pusher plate 86, as is shown in Fig. 6.

A miller cutter 212, shown in Fig. 6, is mounted to rotate about a vertical axis. The shaft 213, passes through bushing 189, and is journalled to bracket 184, through bore 185. The cutter 212, is secured to a gear 214, and together therewith is rotatably mounted on a stud 215, held in the tool post 136. A gear 216, secured at the lower end of the shaft 213, engages gear 214, while the shaft 213 is driven by chain 210 from flanged sprocket 211.

It is obvious at this point, that the axis of rotation of the cutter 202, may be set to be in angular relation with the axis of the shell being spun, in the same manner as the adjustment is made to alter the plane in which tool 137, in Fig. 4, oscillates. Also it can be readily understood that the miller cutters 202 and 212, can simultaneously while being rotated and pushed along the work 139, have imparted to them either or both of both of the rapid short range reciprocating motions. These miller cutters may be replaced with ball and wheel tools as used in the metal spinning trade. It is to be noted that the racks 193 and 177, are made wide to permit a vertical movement of the shaft 187, and the member 173 together with all associated therewith, at the same time maintaining the engagement of said racks with the gears 192 and 174 respectively. For like reason is the sprocket 211 made wide. The flanges 207 and 217 serve to prevent the chain 210, from becoming disengaged from the sprockets 206 and 211.

Should it be desired to feed the working tool 137, deeper into or lower onto the work 139, step, by step, I provide for such purpose a means to shift the rack 177, in Fig. 7, bit by bit forward, thereby causing the leading screw 172, by its resulting movement to lower the working tool 137, bit by bit downward, and when the cutting cycles are complete, the working tool 137 is restored to its initial working position.

Onto the shaft 117, atop the pusher plate 86, is set free to rotate the spur gear 218, secured to bevel gear 118, as one unit, and, a spur gear 219, a ratchet wheel 220 and a cam plate 221, secured together as a second unit. For one-half of the circumference, the teeth of both the spur 219, and the ratchet wheel 220, have been removed. A small gear 222, is rotatably mounted on bracket 223 secured to the pusher plate 86. A pawl 224, having a second toothed arm 225, is pivotally mounted on a bracket 226, secured to the pusher plate 86; the tooth of said arm 225, being adapted to periodically engage a rack 227, mounted on bracket 228, secured to the frame of the machine.

In operation, the carriage 41, in its motion up and back in the cycle, will cause to occur that the tooth 225, will come in engagement with the rack 227, whereby the ratchet wheel 220, actuated by its pawl 224, will be moved a little together with the cam plate 221 and the special gear 219, thereby causing the rack 177, through the connecting rod 178, slidingly mounted at 230 in track 229, to be pushed a little forward, whereupon the tool 137, is moved a little downward. Every time the carriage 41, comes back to the tail end of the lathe, the tool 137 will in this manner be fed a little downward; the number of such bit by bit movements depending upon the number of cuts to be taken on the work 139, until the working tool 137 has been fed its set limit, depending upon the number of teeth in the ratchet wheel 220, and the shape of the track 229, in the cam plate 221. And this track 229, may be so designed, that the tool 137 is fed in succeedingly unequal amounts; thereby altering the thicknesses of successive shavings.

When the ratchet wheel 219, has been moved so that the pawl 224 comes onto the clear part of the circumference thereof, the teeth of the spur gear 218, will become engaged with the ever moving gear 222, causing the unit comprising 220 and 221, besides itself to rotate a full half turn until spur gear 219, is out of engagement with the gear 222, and whereupon the teeth of the ratchet wheel 220, are again in position to be in engagement with their pawl 224, for repetition of the functioning of this mechanism, and the tool 137 is again in its initial uppermost position. To change the depth of the cut and the number of cuts to be taken, the special ratchet wheel 220 is changed to one having more or less teeth about its toothed semi-circumference.

The tail spindle holder 142, is journalled in the bearing of the support 42, by a screw 232 engaged within an annular groove 233 in said element 142.

The disc blank centering device is shown in the Figures 13 and 14, and its construction and manner is now explained.

Along a vertical line intersecting the axis of the tail spindle holder 142, which itself is in alignment with the screw shaft 46, and along a line intersecting said axis but at an angle to the vertical, are secured bearing blocks 234, onto the plate 143, each pair of which has journalled therebetween a leading screw 235, terminating in a hand knob 236. Intermediate each such pair of blocks 234, threadedly engaged on the screws 235, are the members 237, each of which is slidably associated in their respective track elements 238. Turning the knobs 236, will alter the distance between the axis and the respective members 237.

The lower member 237, has integral therewith or has secured thereto an angular element 239, the arms of which are symmetrical with the vertical line passing through the axis of the machine. The upper member 237 has secured thereto a forward horizontally projecting prong 242. These components of the centering device are so set initially, that the distance from the axis of the machine to the prong 242, equals the perpendicular distance from said axis or centre to the surface of an arm of the angular member 239, which distance is made to equal the radius of the disc blank 139; the same being constant in the mass production of any one article.

When the cross sections of the patterns 47 and 138, are other than circular, as for instance elliptical, the belt connecting the cone pulleys 45 and 76, is taken off, the said patterns are mounted with similar axis parallel, and both said patterns are rotated in synchronism, by having each driven from shaft 77, through their respective trains of gears terminating in 246 and 247, mounted on plates 248 and 249, respectively; a gear 250 being secured to the chuck 109, and a gear 251 being secured to a rotatably mounted pattern 47. It is evident that spirals or threads can be copied, since the pattern therefor would rotate in synchronism with the chuck pattern having a like spiral groove or thread, while the tools 137 and 234 would move in forward motion.

For another means of spinning tapered shells, I provide a rotatably mounted cam pattern 252, within which and in slidable association therewith is an arm 253 of a pattern tool 254, which arm is sloped in accordance with the slope of the shell to be spun. This cam pattern, designated generally by the numeral 252, consists of an internal pattern element 255, of the shape of the desired elliptical cross-sectioned tapered shell, integral or secured to an external track element 256, which has a hollow 257, shaped similar to, but larger than that of the contour of the pattern element 255, to admit the arm 253 of the tool 254; said elements 252 and 256, being secured in symmetrical relation.

When the shell to be spun has a steep wall as 258, shown in the pattern 259, of Fig. 15, it is essential to provide means that will enable the pattern tool 134, to climb. To this end, I provide in the steep wall 258, a spiral groove 260, and I also provide the tool 134, with a horizontal prong 261, which latter becomes engaged within the groove 260, when the tool 134 has reached said wall 258, whereupon the gear 51, is made to stop its movement along the screw shaft 46, by a shifting of the clutch of the reversing mechanism controlled by the fork 65 and chain attachment 69, into neutral position. Since the pattern 259, revolves continuously, the tool 134 will climb the wall 258, thereby causing similar motion of the working tool 137 along the wall of a similar chuck pattern. When the tool 134 has reached the top of the pattern 259, the reversing mechanism is set to move the gear 51 again forward towards the head end of the machine, so that the tools 134 and 137 can proceed along the remainder of the surfaces of their respective associated patterns.

The back tool 231, is secured in a tool post 262, slidingly mounted on a square-sectioned bar 245, which is pivotally secured to plate 143 by a bracket 263. This bar 245, extends through slot 264 in the pusher plate 86, and terminates engaging a wheel 265 in a curved slot 266, in the latter. This wheel 265, provided with handle 267, is rotatably mounted on the screw shaft 46, at the end which projects beyond the support 44. The slot 266, is of such shape that the bar 245 will be held secure to the plate 265 and adjusted to any desired particular slope, and, by securing the wheel 265 to the shaft 46, the bar 245 will be held in such definite sloped position. Said curved slot 266, commences near the centre of the wheel 265, and continues up to near the periphery of same.

As the working tool 137, is moved along the work 139, so must the back tool 231 be moved forward. Therefore I provide a T member 268, having one arm adjustable in length in coupling 269, and the other arm of which is provided with a lengthwise slot 270, through which, in sliding close fit, passes a screw 271 threadedly engaged in the tool post 262. The end of the adjustable arm, is also provided with a slot 272, through which, in sliding close fit, projects a pin 273, which is integral with bracket 274, secured to the pusher plate 86; said pin 273, acting as a fulcrum for the T arm 268. A spring 274, sets within said slot 272, and acts against the pin 273. The purpose of this construction is to permit the back tool 231 to receive the forward stroke of the short range reciprocating motion imparted by the mechanism shown in Fig. 10, but to avoid said back tool 231, from having imparted thereto the backward stroke of said motion; it being intended that said back stroke be absorbed by the spring 274. I also show an arrangement in Fig. 20, to shift the back tool 231 along its path. Here, the back tool is pushed, through connecting rod 275 which is associated in the cam plate 276; the latter being mounted atop the pusher plate 86, and slowly rotated by the system of gearing mounted on said plate.

In place of the back tool 231, I substitute a preliminary tool 277, which may act in concert with the working tool 134, or which may function alone in the spinning of shells. I show in Fig. 22, an instance wherein said tool 277 acts alone in the spinning of tapered shells on a chuck pattern 138. In such instance, the slope of the bar 245, is set at the slope of the pattern 138. The T member 279, which pushes the preliminary tool 277, is pivoted in bracket 278 secured to the pusher plate 86.

By use of the preliminary tool 277 alone, shells of different shapes, as for instance as shown in Fig. 23, may be spun by providing a block pattern 280 and a spaced track element 281 secured thereto, atop of the bar 245, with provision that the tool post 262, remain in constant vertical position while it is being pushed along the contour of the pattern 280, which is similar to the contour of the pattern 138. To do so, the arm 279, is secured in fixed position in the bracket 278, by inserting a second pin 281, through bore 282, and, the screws 271, 283, and 284 are set in vertical alignment in the tool post 262, through slot 279; the screw 284 having a projecting end in engagement with the pattern 280, between the latter and the track element 281.

To impart to the preliminary tool 277, an up and down, short range, reciprocating motion while it is being carried along the work, I provide a gear 285, rotatably mounted on the screw shaft 46, in engagement with a gear 286, which is secured to shaft 48. A third gear 287, is in engagement with gear 285, and has secured thereto a wheel 288, having a pin 289 set off center therein. A connecting rod 290, is pivotally linked at its ends between pin 289 and the bar 245; the length of which rod determines the limits of the slope of the bar 245. To adjust such slope, the rod 290 may be made adjustable in length by splitting same and having its parts secured in a coupling as 269.

For forming very short tapered tubes out of short lengths of uniform tubing 291, I provide as shown in Fig. 21, wherein the tool post 262, bearing tool 277, is secured by a set screw 292, onto the square-sectioned bar 293, which is pivoted at one end in the bracket 278, secured to the pusher plate 86. Through a plate 294, demountably secured to plate 143, passes in threaded engagement the radially positioned screw 295, which projects into a central vertical slot 296, cut in said plate 294. This screw 295, is ball tipped at its lower end and is in socket engagement with a cubical block 297, which rests on the bar 293. A coil spring 298, is secured at one end to a screw 299 in the tool post 262, and its other end is secured to a screw 300 in the plate 294. The bar 293, passes through a slot 301 in plate 143 therefor provided and through the slot 296 in plate 294, both of which slots are aligned.

A short piece of tubing 291, is set onto a tapered chuck pattern 302, in this instance held secure in the jaws 303, of the chuck 100. This pattern 302, has a threaded head 304 which is screwed into the bore 305 of the tube 314. The tool 277, in this operation, is moved away from the head end of the lathe, instead of the usual manner of working towards the head end; said tool 277 commencing its work at the base of the cone, instead of at the apex. In this arrangement it is evident that when the pusher plate 86, is nearest the head end of the lathe, the tool 277, is at a certain distance from the axis of the tube 291, and this distance gradually diminishes as the pusher plate 86 recedes from the head end towards the tail end of the machine.

In the chuck mechanism, designated generally by the numeral 100, I provide a member designated generally by the numeral 306, circular in cross section throughout, and terminating at one end in an inwardly threaded reduced portion 307, and at its other end in an externally threaded portion 308. At the junctions of the body of member 306, and each of its said special ends, is an integral flange 309, thus providing a pair of flanges, intermediate which, the member 306 is provided with a key seat into which sets the key 310, to secure the cone pulley 45, onto said member 306.

The member 306, is rotatably mounted in the pillow blocks 311 of the head bearings of the machine; the distance between the flanges 309, being equal to that between the remote faces of the head bearings, so that chuck member 306, is perfectly journalled. The pillow blocks 311, although shown solid in the drawings, are of the ordinary type having demountable caps to facilitate the mounting and removal of the member 306. Longitudinally through the member 306, are the large terminal chambers 312 and 313, joined by the central bore of comparatively smaller diameter, through the latter of which is slidingly mounted a tube 314, which is maintained in non-rotatable relation with respect to member 306, by pin 315, set radially through the body of member 306, to engage the tube 314 in a slot 316.

A tubular member 317, at its reduced end 318, is rotatably mounted onto the end of tube 314, within the chamber 312, while a spool member 319, having internally threaded terminal flanges, is secured to the other end of tube 314, within the chamber 313. A tubular member 320, flanged at its projecting end and tapered at the other, is rotatably mounted through a central bore in cap member 321, which is slidably secured about the end 307 of the chuck member 306, by set screws 322 therein, engaging the said end 307, in the surface grooves 323; the tapered portion 328, of the member 320, lying within the tubular member 317. A fork lever 101, pivoted at 324, to a bracket 325, secured to the frame of the machine, slidingly engages the member 320, between the latter's external flange 326, and the cap member 321. A collar 327, secured about the member 320, within the cap member 321, insures, that upon the movement of the fork 101, the cap and its associated member 320, will also move along, to or fro.

Radially, through the walls of the tubular member 317, are slidingly mounted a pair of pins 329, the inward, headed ends of which engage the tapered portion 328 of the member 320, within the longitudinal surface grooves 330, and the outer ends of which are adapted to become engaged in the square thread inside of the end 307, of the chuck member 306, when the fork 101, moves the member 320 inward. A stiff coil spring 331, is set, one about the portion of each pin 329, which is within the member 317, to urge said pins out of engagement from said thread in end 307.

The end 308, of chuck member 306, has a central outwardly flared funnel bore 332, as the terminus of the chamber 313. A number of jaw members 303, are positioned equi-distant about the shank of the spool member 319, while the flange of the latter sets within a channel 333, cut in the jaw members transversely therein. Each jaw member 303, has an upper surface sloping similar and in position opposite the tapered surface of the flared bore 332, and an external portion terminating in a gripping end provided with a serrated surface 337, facing the axis of the lathe. Through a bore 334, in each jaw member 303, is secured a screw 335, by its head, while the shank of which screw is slidably engaged within a socket drilled radially into the flange of the spool member 319. A spring 336, about the shank of each screw 335, urges the respective jaws 303 apart. It is apparent, that upon a movement of the tube 314, the jaws 303, will either approach each other to close upon and grip an object placed between them, or will move away from each other to release any object previously held between them; id est, such movement of the tube 314, will "open" or "close" the chuck 100.

Initially, the fork lever 101, is in position so that the member 320, is pulled outward a little from within the member 317, in which instance the pins 329 will lie in slot 330 near the smaller end of the taper 328, and in such position will be free from the threads in end portion 307. The spring 344, within chamber 313, about tube 314, pressing against spool 319, will shift tube 314 so that jaws 303 will be free to be urged apart by their respectively associated springs 336 upon movement out of flare bore 332. When however, the fork lever 101, is shifted by and upon actuation of its leading screw 102, to push member 320 further within member 317, the pins 329 will be shifted radially outward, because of the increase of the diameter of the section of the tapered portion with which they are in contact, so that they become engaged in the threads of the end portion 307, whereupon, the jaws 303 will be moved inward and brought to close in and firmly grip any object between them, due to the resulting movement of the tube 314 towards member 320, caused by the dragging of member 317 in that direction. It is to be noted that when the pins 329 become engaged in the threads interior of end 307, the member 317 will lag with respect to rotating member 306, whereby pins 329 will be carried in the spiral of the thread towards the open end of portion 307, thus sliding the tube 314 in like direction. To open the chuck, the fork 101 is now moved to shift member 320 away from the jaw end of the chuck 100, whereby the pins 329 will fall and become disengaged from the threads aforesaid, thus permitting spring 344 to shift tube 314 towards said jaw end urging jaws 303 outward to "open" position.

It is to be noted that member 317, will continue to lag behind in its rotary movement with respect to that of the continuously revolving chuck member 306, only until the jaws 303 "close", whereupon all components of the chuck 100 will rotate along with the body 306. This chuck is free of all lateral thrust with respect to the bearings of the head of the machine, for the reaction of the pins against member 306 is equal and opposed to the reaction of the jaws 303 against said chuck member 306, hence there is established a system of stabilized forces acting on one member 306, causing no resultant motion.

The bore diameters of members 320, 314 and 319, may be of such dimension to permit stock rods or tubes to be fed therethrough as is usual in automatic machine work, since no pattern is mounted in the chuck mechanism 100 in turning operations.

To secure the chuck pattern 138, for spinning operations, I provide a member generally designated by the numeral 338, which is comprised of three integral portions, namely, an interior threaded cap portion 339 for mounting member 338 onto the end portion 308 of the chuck member 306, a gear portion 250, and a reduced, threaded stud portion 340, adapted to receive the chuck pattern 138.

An ejector adapted to throw spun shells 139 from off the chuck pattern 138, consists of an externally threaded collar 341 secured in the threaded bore 305, an ejector rod 342 slidingly mounted through said collar 341, being of a length sufficient to project beyond the pattern 138 through a central bore in said pattern provided, and a spring 343 positioned about said rod 342, having one of its ends secured to said rod while its other end presses against the collar 342. Upon the backward movement of the carriage 41, after completion of the spinning operation, the shell 139, is free to be thrown off the pattern by the movement of the ejector rod 342, so urged by the spring 343.

All ejectors which may be required, depending upon the class of work being done by the machine, are mounted in the forward threaded end 305 of the spool member 319.

An embodiment of a disc feeding device indicated in Fig. 1, by the numeral 141, is shown in Fig. 26, wherein, atop a bracket 340, which is secured to the frame of the machine, is mounted a plate member 341, having an upright element 342, which bears a bar 343 of dove tail cross section. This bar 343, is horizontally mounted at one end and extends towards the head end of the lathe to a point up to and over the chute 140. A slide member 344 having a dove tail channel, is slidably mounted on bar 343, and a rack member 345 is secured at one of its ends to said slide member 344, and extends horizontally towards the tail end of the machine. On a pin 346, fixed vertically in plate member 341, is rotatably mounted a ratchet gear 347, which engages the rack 345, and in turn is engaged by a pawl 348, which is mounted on a pin 349, fixed in plate 341. A lever 350, having an upwardly extending lug 351, in contact engagement with the pawl 348, is likewise mounted on the pin 349, while springs (not shown) are provided which urge the pawl 348 against the ratchet gear 347, and the prong 351 against the pawl 348.

The slide member 344 has a substantially circular portion 352, at the extremities of the horizontal diameter of which, are secured the ends of racks 353 and 354, in parallel alignment with the bar 343, while at the very top, is another rack 355 secured by a hinge 356. It is to be noted that the teeth of these three racks face inwardly and are in circumferential alignment. A disc plate 357, positioned parallel to element 352, has secured at the extremities of its horizontal diameter, the other ends of the rack members 353 and 354.

The rack 355, is swung upward and blanks 139 are set resting on the bar 343 and between opposite teeth of the racks 353 and 354. Then the rack 355 is lowered to set atop these discs 139, which fall in between the teeth of said top rack. When the carriage 41, moves towards the tail end of the machine, an arm (not shown) which is secured to the plate 143, trips the lever 350, whereby the pawl 348 will turn the ratchet 347 counter-clock-wise one tooth, causing the slide 344 and all associated therewith to move a step towards the chute 140. A disc 139 thereby slips off the bar 343 and falls down the chute 140, into the centering device onto the arms of the angular member 239 and against the pin 242, and this action is so timed that the blank 139 shall lie between the working tool 137 and the tool 231. When the lever 350 is again tripped on forward motion of the carriage 41, the pawl 348 is not disturbed, for the lug 351 is moved away from the tooth of the pawl.

Should it be desired to feed short pieces of tubing or rod 358 into the chuck 100, I provide a device shown in Fig. 27. Here, a rectangular tube hopper 359, is pivotally mounted near its top end (not shown) and is urged by spring means against an arm 360, which is secured to the slide 109; the movement of which slide determines the position of the bottom end of the hopper tube 359 with respect to the axis of the machine. This hopper 359, near its bottom end is open and terminates in an integral U shelf portion or strap 361, upon which rests the lowest piece of rod or tubing 358 which fill the hopper tube 359. A plunger 362, having a square sectioned shank, is slidably mounted in horizontal position through an arm 363 extending downwards from the tube hopper 359, and said plunger is in alignment with the lowest piece 358 resting on shelf 361, and in line with the axis of the machine, which is the horizontal line passing thru the centre of chuck 100 and the spindle 156. This plunger 362, is pushed by an upright 364 which is secured to the slide 108; a downwardly extending arm 365, being secured to the shank of the plunger and in position to be pushed by the upright 364, when the slide 108 moves towards the chuck 100. A spring 366, about said shank, urges the plunger 362 away from contact with the pieces 358.

To feed such rod or tube pieces 358, into the chuck 100, the slide 109 is made to move forward, thereby bringing the hopper tube 359 into such forword position that the lowest rod or tube piece 358 is in alignment with the axis of the machine before the jaws 303. Then the slide 108 is made to move towards the chuck 100, whereby the lowest piece 358 is pushed between the jaws 303, which latter then close, whereupon the slides 108 and 109 are both moved to clear the path for the tools 231 and 137.

The upright 364, is purposely made low, so that the said tools will have a clear path, and the upper end of the arm 360 is made broad so that it remain in contact with the hopper tube 359, upon movement of the slide 108.

Should it be desired to feed stock rod or tubing 367 through the chuck 100, I provide a device shown in Fig. 28, wherein on each of the slides 108 and 109, I secure the members 368 and 369, respectively, which latter terminate at their upper ends in vise jaw form. The slide 108 is moved so that member 368 is in contact with rod 367, then the slide 109 is moved forward so that the rod 367 becomes gripped between members 368 and 369. Now, the slide 108 is slid away from the chuck 100; thereby pulling the stock rod 367 out through the chuck, a predetermined distance, depending upon adjustment made for the scope of the operation of said slides. The slides 108 and 109, are now both moved to their original position to clear the path for the working tools.

Since the ride of the carriage 41, is determined by the length of the gear 55, a gear of appropriate length is put in place thereof for different lengths of shells or other work. Should it be required to spin a shell or turn a piece of work having the same length as that of a pattern 47, but of a diameter at every point along its length, either always larger or always smaller, by a fixed amount, than the diameter at similar points along the length of the pattern, then the working tool 137 is initially set either above or below the horizontal passing through the pattern tool 134, as the case may require. Also, the preliminary tool 227, may be an aid to the working tool 137, and may have a path of motion dis-similar to that of the working tool 137, or both said tools may have parallel motions. Cut-off and trimming tools may be mounted on the slides 108 and 109, and the machine may be constructed in duplicate or triplicate combinations, all of the preliminary and working tools of which would operate or perform upon a single piece of work associated with the sole chuck of such machine; in which instance there would be a series of patterns, each controlling related and individually controlled tools and respective associated mechanisms, which would be duplications of the machine components illustrated in the drawings herein.

Having described my invention, I claim:—

1. In a machine of the class described, the combination of a lathe bed, a carriage slidable thereon, means to move the carriage to and fro along the lathe bed, a member slidably mounted on the carriage, means to move said slidable member along the carriage, a pattern tool associated with a working tool, both adapted to be moved to and fro with respect to the lathe bed by said slidable member, and means to simultaneously impart to the working tool, a comparatively rapid short range reciprocating motion; the lines of both motions of the working tool being identical.

2. In a machine of the class described, the combination of a lathe bed, a carriage slidable thereon, means to move the carriage to and fro along the lathe bed, a member slidably mounted on the carriage, means to move said slidable member along the carriage, a pattern tool associated with a working tool, both adapted to be moved to and fro with respect to the lathe bed by said slidable member, and means to simultaneously impart to the working tool, a comparatively rapid short range reciprocating motion; the lines of both motions of the working tool being perpendicular.

3. In a machine of the class described, the combination of a lathe bed, a carriage slidable thereon, means to move the carriage to and fro along the lathe bed, a member slidably mounted on the carriage, means to move said slidable member along the carriage, a pattern tool associated with a swingably mounted working tool, both tools being adapted to be moved to and fro with respect to the lathe bed by said slidable member, and means to simultaneously impart to the working tool, an oscillating swinging motion; the line along which the working tool is made to reciprocate by the motion of the slidable member lying within the plane in which the working tool is made to oscillate.

4. In a machine of the class described, the combination of a lathe bed, a carriage slidable thereon, means to move the carriage to and fro along the lathe bed, a member slidably mounted on the carriage, means to move the slidable member along the carriage, a pattern tool associated with a swingably mounted working tool, both tools being adapted to be moved to and fro with respect to the lathe bed by said slidable member, and means to simultaneously impart to the working tool, an oscillating swinging motion; the line along which the working tool is made to reciprocate by motion of the slidable member being in angular relation to the plane in which the working tool is made to oscillate.

5. In a machine of the class described, the combination of a lathe bed, a carriage slidable thereon, means to move the carriage to and from along the lathe bed, a member slidably mounted on the carriage, means to move said slidable member along the carriage, a pattern tool associated with a swingably mounted working tool, both tools being adapted to be moved to and fro with respect to the lathe bed by said slidable member, means to simultaneously impart to the working tool, an oscillating swinging motion, and means adapted to alter the plane in which the working tool is made oscillate.

6. In a machine of the class described, the combination of a working tool, means to impart to said tool a reciprocating motion, and means to impart simultaneously to said tool any combination of a comparatively rapid short range reciprocating motion along a line identical with the line of the motion first mentioned, a comparatively short range reciprocating motion along a line perpendicular to the line of said first mentioned motion and an oscillating motion.

7. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a shaft rotatably mounted onto the lathe bed, a member revolvably mounted onto the slidable member, means adapted to impart a rotary motion to said revolvable member slidably associated with and adapted to be driven by the shaft, a pattern toool associated with a working tool holder, both adapted to be moved to and fro with respect to the lathe bed by said slidable member, a working tool rotatably mounted in the working tool holder and means to impart rotary motion to the working tool from the aforesaid revolvable member.

8. In a machine of the class described, the combination of a revolvable working tool, means to impart to said tool a reciprocating motion and means to simultaneously impart to said tool any combination of a comparatively rapid short range reciprocating motion along a line identical with the line of the motion first mentioned, a comparatively short range reciprocating motion along a line perpendicular to the line of said first mentioned motion and a rotary motion.

9. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a shaft rotatably mounted onto the lathe bed, a member revolvably mounted on the slidable member and means adapted to impart a rotary motion to said revolvable member slidably associated with and adapted to be driven by the shaft.

10. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a shaft rotatably mounted onto the lathe bed, a member revolvably mounted on the slidable member, means adapted to impart a rotary motion to said revolvable member slidably associated with and adapted to be driven by the shaft, a pattern tool associated with a working tool holder, both adapted to be moved to and fro with respect to the lathe bed by the said slidable member, working tool actuating mechanism associated with the working tool holder, and means associated with said revolvable member adapted to control and manipulate said working tool actuating mechanism.

11. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a bar member secured to the carriage, a tool post slidably mounted on the bar member and an arm secured to the tool post and the slidable member whereby the tool post is slid along the bar member upon motion of the slidable member.

12. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a shaft rotatably mounted onto the lathe bed, a member revolvably mounted on the slidable member, means adapted to impart a rotary motion to the revolvable member slidably associated with and driven by the shaft, a bar member secured to the carriage, a tool post slidably mounted on the bar member, and means associated with said revolvable member adapted to slide and control the motion of the tool post along the bar member.

13. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a bar member pivotally secured to the carriage, a means to alter and set the slope of said bar member, a tool post slidably mounted on the bar member, and means associated with the slidable member adapted to move and control the motion of the tool post along the bar member.

14. In a machine of the class described, the combination of a lathe bed, a carriage slidable thereon, means to move and control the motion of the carriage to and fro along the lathe bed, a member slidably mounted on the carriage, means to move and control the motion of said member to and fro along the carriage, a bar member pivotally mounted on the carriage, means to impart to said bar member a swinging motion, a tool post slidably mounted on the bar member and means associated with the slidable member adapted to move and control the motion of the tool post along the bar member.

15. In a machine of the class described, the combination of a lathe bed, a carriage slidable thereon, means to move and control the motion of the carriage to and fro along the lathe bed, a member slidably mounted on the carriage, means to move and control the motion of the slidable member to and fro along the carriage, a bar member secured to the carriage, a pattern demountably secured to the bar member, a tool post having an extending element thereof slidably secured to the pattern and adapted to be slid to and fro along the contour of the pattern and means associated with the slidable member whereby upon motion of said slidable member, the tool post will be made to travel a path similar to the contour of the pattern.

16. In a machine of the class described, the combination of a lathe bed, a carriage slidable thereon, means to move and control the motion of the carriage to and fro along the lathe bed, a member slidably mounted on the carriage, means to move and control the motion of the slidable member to and fro along the carriage, a bar member pivotally mounted on the carriage, means to alter and set the slope of the bar member, a pattern secured to the bar member, a tool post having an extending element thereof slidably secured to the pattern and adapted to be slid to and fro along the contour of the pattern and means associated with the slidable member whereby upon motion of said slidable member, the tool post will be made to travel a path similar to the contour of the pattern.

17. In a machine of the class described, the combination of a lathe bed, a carriage slidable thereon, means to move and control the motion of the carriage to and fro along the lathe bed, a member slidably mounted on the carriage, means to move and control the motion of the slidable member to and fro along the carriage and means to simultaneously impart to said slidable member a comparatively short range and rapid reciprocating motion, the lines of both motion of said slidable member being identical, a bar member secured to the carriage, a tool post slidably mounted on the bar member, an arm pivotally secured to the tool post and flexibly secured to the slidable member, whereby the tool post is slid to and fro along the bar member and adapted to have imparted to it the motion in only one direction of the aforesaid short range reciprocating motion.

18. In a machine of the class described, the combination of a lathe bed, a carriage slidable thereon, means to move and control the motion of the carriage to and fro along the lathe bed, a member slidably mounted on the carriage, means to move and control the motion of said slidable member along the carriage, a bar secured to the carriage, a tool post slidably mounted on the bar member, a pattern tool associated with a working tool, a preliminary tool secured in said tool post in a position in advance of the working tool; all three tools mentioned being adapted to be moved by the slidable member aforesaid.

19. In a machine of the class described, the combination of a lathe bed, a carriage slidable thereon, means to move and control the motion of the carriage to and fro along the lathe bed, a member slidably mounted on the carriage, means to move and control the motion of said slidable member along the carriage, a pattern tool associated with a working tool, both adapted to be moved to and fro with respect to the lathe bed by said slidable member, a shaft rotatably mounted onto the lathe bed, a member revolvably mounted on the slidable member, means adapted to impart a rotary motion to said revolvable member slidably associated with and driven by said shaft, a bar secured to the carriage, a tool post slidably associated with said bar member, and means associated with said revolvable member adapted to move and control the motion of the tool post with respect to said bar member.

20. The combination of a stationary member provided with a slot, a moveable member, a bar member pivotally secured to the moveable member and extending beyond the stationary member through said slot, a tool post secured to the bar member, and a flexible means secured to and between the bar member and the stationary member, adapted to maintain said bar against the end of the slot in the stationary member.

21. The combination of a stationary member provided with a slot, a moveable member, a bar member pivotally secured to the movable member and extending beyond the stationary member through said slot, a tool post secured to the bar member, a member secured to and slidably associated with the stationary member along said slot, and flexible means secured to and between the bar member and the stationary member adapted to maintain said bar against said slidable member.

22. In a machine of the class described, the combination of a revolvably mounted pattern having a non-steep wall followed by a steep wall which latter is provided with a spiral groove, means to revolve the pattern, a follower tool in contact slidable relation with the pattern, having an extending prong which is adapted to engage the pattern in said groove to maintain the contact of the tool and the pattern whereby said tool will follow the contour of the pattern along its steep wall and means to carry the tool along the non-steep wall after said tool has fully transversed the steep wall of the pattern.

23. In a machine of the class described, the combination of a revolvably mounted pattern comprising a tapered inner element spaced concentrically within a tubular element, the interior of the outer element being similar to the exterior of the inner element, means to rotate the pattern, a pattern tool positioned between said pattern elements and in continuous contact with both of them, a working tool adapted to be led by the pattern tool, and means to slide the pattern tool to and fro along a line parallel with the axis of the pattern whereby the working tool is made to describe a surface identical to that of the inner pattern element.

AARON SHATKIN.